(12) United States Patent
Borean et al.

(10) Patent No.: US 9,103,237 B2
(45) Date of Patent: Aug. 11, 2015

(54) INTERNAL-COMBUSTION ENGINE WITH CYLINDERS THAT CAN BE DEACTIVATED, IN WHICH THE DEACTIVATED CYLINDERS ARE USED AS PUMPS FOR RECIRCULATING THE EXHAUST GASES INTO THE ACTIVE CYLINDERS, AND METHOD FOR CONTROLLING SAID ENGINE

(71) Applicant: C.R.F. SOCIETÀ CONSORTILE PER AZIONI, Orbassano (Torino) (IT)

(72) Inventors: Fabio Borean, Orbassano (IT); Sabino Luisi, Orbassano (IT); Andrea Stroppiana, Orbassano (IT)

(73) Assignee: C.R.F. SOCIETA CONSORTILE PER AZIONI, Orbassano (Torino) (IT)

( * ) Notice: Subject to any disclaimer, the term of this patent is extended or adjusted under 35 U.S.C. 154(b) by 212 days.

(21) Appl. No.: 13/736,617

(22) Filed: Jan. 8, 2013

(65) Prior Publication Data

US 2013/0276730 A1 Oct. 24, 2013

(30) Foreign Application Priority Data

Apr. 19, 2012 (EP) .................................... 12164818

(51) Int. Cl.
*G06F 19/00* (2011.01)
*F02B 47/08* (2006.01)
(Continued)

(52) U.S. Cl.
CPC ... *F01L 1/34* (2013.01); *F01L 1/26* (2013.01); *F01L 1/267* (2013.01); *F01L 9/021* (2013.01);
(Continued)

(58) Field of Classification Search
CPC ................... F01L 2001/34486; F02D 13/0261; F02D 41/0087; F02D 41/006; F02D 41/0062; F02M 25/0752
USPC ......... 123/698, 568.14, 568.13, 198 F, 90.11, 123/90.12, 90.15, 90.16, 90.17, 90.18, 325, 123/332, 345, 346, 347, 481; 701/108, 112, 701/104; 60/285, 278
See application file for complete search history.

(56) References Cited

U.S. PATENT DOCUMENTS 5,642,703 A * 7/1997 Stockhausen et al. ..... 123/198 F
5,934,263 A   8/1999 Russ et al.
(Continued)

FOREIGN PATENT DOCUMENTS

EP   0 803 642   10/1997
EP   0 931 912    7/1999
(Continued)

OTHER PUBLICATIONS

Search Report for EP 12164848 dated Sep. 10, 2012.

*Primary Examiner* — Lindsay Low
*Assistant Examiner* — George Jin
(74) *Attorney, Agent, or Firm* — Nixon & Vanderhye, PC (57) ABSTRACT

In an internal-combustion engine provided with a system for variable actuation of the intake valves of the cylinders, some of said cylinders are deactivated in given conditions of operation of the engine by interrupting the supply of fuel. During de-activation, the cycle of opening and closing of the intake valves and exhaust valves of the deactivated cylinders is maintained. The intake valves of each deactivated cylinder are opened when the exhaust valves of the same cylinders are also open. The inactive cylinders are used as reciprocating volumetric pumps for recirculation of exhaust gases from the exhaust manifold of the engine up to the intake manifold. The recirculated gases are cooled in the intake manifold by the air introduced into the latter and can consequently be fed in a larger mass to the active cylinders, which enables a better global efficiency of the engine to be obtained.

6 Claims, 8 Drawing Sheets

(51) Int. Cl.
  *F01L 1/34* (2006.01)
  *F02D 41/00* (2006.01)
  *F01L 9/02* (2006.01)
  *F02M 25/07* (2006.01)
  *F02D 13/02* (2006.01)
  *F02D 13/06* (2006.01)
  *F02D 17/02* (2006.01)
  *F01L 1/26* (2006.01)
  *F01L 13/00* (2006.01)
  *F01L 1/344* (2006.01)

(52) U.S. Cl.
  CPC ............ *F01L 9/025* (2013.01); *F01L 13/0015* (2013.01); *F02D 13/0226* (2013.01); *F02D 13/0261* (2013.01); *F02D 13/06* (2013.01); *F02D 17/026* (2013.01); *F02D 41/006* (2013.01); *F02D 41/0057* (2013.01); *F02D 41/0087* (2013.01); *F02M 25/0748* (2013.01); *F02M 25/0752* (2013.01); *F01L 2001/34446* (2013.01); *F01L 2013/001* (2013.01); *F02D 2041/0012* (2013.01); *Y02T 10/18* (2013.01); *Y02T 10/47* (2013.01)

(56) References Cited

U.S. PATENT DOCUMENTS

| | | | |
|---|---|---|---|
| 6,382,193 B1 * | 5/2002 | Boyer et al. | 123/560 |
| 2001/0050070 A1 * | 12/2001 | Xu et al. | 123/295 |
| 2006/0241849 A1 * | 10/2006 | Gangopadhyay | 701/108 |
| 2009/0013669 A1 * | 1/2009 | Winstead | 60/278 |
| 2010/0077730 A1 * | 4/2010 | Lewis | 60/285 |
| 2011/0313643 A1 * | 12/2011 | Lucatello et al. | 701/112 |

FOREIGN PATENT DOCUMENTS

| | | |
|---|---|---|
| EP | 0 939 205 | 9/1999 |
| EP | 1 091 097 | 4/2001 |
| EP | 1 243 761 | 9/2002 |
| EP | 1 243 762 | 9/2002 |
| EP | 1 243 763 | 9/2002 |
| EP | 1 243 764 | 9/2002 |
| EP | 1 245 799 | 10/2002 |
| EP | 1 273 270 | 1/2003 |
| EP | 1 321 634 | 6/2003 |
| EP | 1 338 764 | 8/2003 |
| EP | 1 344 900 | 9/2003 |
| EP | 0 961 870 | 3/2004 |
| EP | 1 635 045 | 3/2006 |
| EP | 1 635 046 | 3/2006 |
| EP | 1 635 057 | 3/2006 |
| EP | 1 674 673 | 6/2006 |
| EP | 1 726 790 | 11/2006 |
| EP | 1 936 132 | 6/2008 |
| EP | 2 017 439 | 1/2009 |
| EP | 2 067 968 | 6/2009 |
| EP | 2 108 800 | 10/2009 |
| EP | 2 138 680 | 12/2009 |
| EP | 2 184 451 | 5/2010 |
| EP | 2 184 452 | 5/2010 |
| EP | 2 397 674 | 12/2011 |
| EP | 2397674 B1 * | 10/2012 |
| GB | 2473481 | 3/2011 |

* cited by examiner

FIG. 9

INTERNAL-COMBUSTION ENGINE WITH CYLINDERS THAT CAN BE DEACTIVATED, IN WHICH THE DEACTIVATED CYLINDERS ARE USED AS PUMPS FOR RECIRCULATING THE EXHAUST GASES INTO THE ACTIVE CYLINDERS, AND METHOD FOR CONTROLLING SAID ENGINE

This application claims priority to EP 12164818.2 filed Apr. 19, 2012, the entire contents of each of which is hereby incorporated by reference.

FIELD OF THE INVENTION

The present invention relates to multi-cylinder internal-combustion engines, of the type comprising:
- a plurality of cylinders;
- an intake manifold and an exhaust manifold, each with a chamber in common and respective intake ducts or runners and exhaust ducts or runners that connect said common chamber to said cylinders;
- at least one intake valve and at least one exhaust valve for each cylinder, associated to respective intake and exhaust runners;
- a first system for variable actuation of the intake valves;
- a second system for supply of fuel to each cylinder; and
- electronic control means for controlling said first system and said second system, wherein said electronic control means are programmed for interrupting supply of fuel to one or more cylinders of the engine in given conditions of operation of the engine so as to deactivate said cylinders, maintaining, instead, supply of fuel to one or more further cylinders, which thus remain active, wherein said electronic control means are moreover programmed for maintaining an operating cycle of opening and closing of the intake and exhaust valves of the deactivated cylinders, and
wherein said electronic control means are moreover programmed for keeping said at least one intake valve of each deactivated cylinder open when said at least one exhaust valve of said deactivated cylinder is also open.

PRIOR ART

An example of engine of the type specified above is described and illustrated in the document No. EP 2 397 674 A1 filed in the name of the present applicant. Said document describes a solution in which the system for variable actuation of the engine intake valves is exploited for keeping the intake valves of the deactivated cylinders open during a substantial part of the phase in which the exhaust valves of the deactivated cylinders themselves are open so as to obtain that part of the exhaust gases recirculates in the intake runners of the deactivated cylinders. In said known solution, the mass of the recirculated exhaust gases remains, however, in the respective intake runner, without reaching the plenum of the intake manifold so that it does not mix with the air fed to the cylinders that have remained active. Once again in the case of said known solution, the intake valves of the deactivated cylinders are closed after closing of the exhaust valves as soon as in the subsequent intake stroke the exhaust gases that have remained in the respective intake runner are returned into the cylinder and before a significant amount of fresh air starts to enter the cylinder. In this way, neither supporter of combustion nor fuel is introduced during the intake stroke into the deactivated cylinders so as to minimize pumping losses. Basically, the mass of the exhaust gases continues to rebound between the combustion chamber of the deactivated cylinder and the runner of the respective cylinder.

Studies and experiments conducted by the present applicant have shown that the advantages in terms of higher engine efficiency and of lower consumption that can be achieved with said solution are not, however, fully satisfactory.

OBJECT OF THE INVENTION

The object of the present invention is to provide an engine with cylinders that can be deactivated, of the type referred to above, which will present a higher efficiency than known solutions.

A further object of the invention is to achieve the aforesaid purpose with simple and low-cost means.

SUMMARY OF THE INVENTION

With a view to achieving the aforesaid purposes, the subject of the invention is an engine having all the characteristics that have been referred to above and is moreover characterized in that the opening lift and the opening duration of said at least one intake valve of each deactivated cylinder in the step of operation of the engine with cylinders deactivated are chosen in such a way that said deactivated cylinders are able to pump exhaust gases from the common chamber of the exhaust manifold up to the common chamber of the intake manifold of the engine, whereby said recirculated exhaust gases enter the active cylinders after being cooled by the air present in the intake manifold, so as to enable a larger mass thereof to enter into the active cylinders.

Preferably, the aforesaid electronic control means are programmed for keeping said at least one intake valve of each deactivated cylinder open only when said at least one exhaust valve of the same deactivated cylinder is also open. Even more preferably, said electronic control means are programmed for closing said at least one intake valve of each deactivated cylinder (II, III) substantially simultaneously with closing of said at least one exhaust valve of the same deactivated cylinder.

Consequently, unlike the known solution described above, where the exhaust gases recirculated by the deactivated cylinders never reached the common chamber of the intake manifold so as to render the pumping losses minimal, the present invention moves, instead, in a conceptually opposite direction, rendering said pumping losses higher. The studies and experiments conducted by the present applicant have in fact surprisingly shown that the higher pumping losses that occur in the engine according to the invention when part of the cylinders is deactivated are amply compensated by the higher efficiency of the engine due to the greater mass of recirculated exhaust gases that enters the active cylinders during the intake stroke.

The engine according to the invention is provided with a system for variable actuation of the intake valves of the cylinders of any known type designed to enable variation of opening time and/or lift of the intake valves of each cylinder of the engine irrespective of the intake valves of the other cylinders. The preferred embodiment that will be illustrated herein regards an engine provided with a MULTIAIR (registered trademark) system of the type that is described, for example, in the document No. EP 2 397 674 A1, as well as in various further documents, amongst which: EP-A-0 803 642, EP-A-0 961 870, EP-A-0 931 912, EP-A-0 939 205, EP-A-1 091 097, EP-A-1 245 799, EP-A-1 243 763, EP-A-1 243 762, EP-A-1 243 764, EP-A-1 243 761, EP-A-1 273 270, EP-A-1 321 634, EP-A-1 338 764, EP-A-1 344 900, EP-A-1 635 045, EP-A-1 635 046, EP-A-1 653 057, EP-A-1 674 673, EP-A-1 726 790, EP-A-1 936 132, EP-A-2 067 968, EP-A-2 184 452, EP-A-2 017 439, EP-A-2 108 800, EP-A-2 138 680, and EP-A-2 184 451.

However, the invention can be applied also to engines provided with systems for variable actuation of the engine valves that differ from the Multiair system, whether of an electro-hydraulic type or of the "camless" type, where the engine valves are driven by electronically controlled electromagnetic actuators, the sole essential condition being that the system is such as to enable actuation of the valves of one cylinder irrespective of those of the others.

A further subject of the present invention is the method for controlling the engine according to the modalities described above.

BRIEF DESCRIPTION OF THE FIGURES

The invention will be better illustrated with reference to the annexed drawings, which are provided purely by way of non-limiting example and in which.

DESCRIPTION OF A PREFERRED EMBODIMENT

Figure 1:
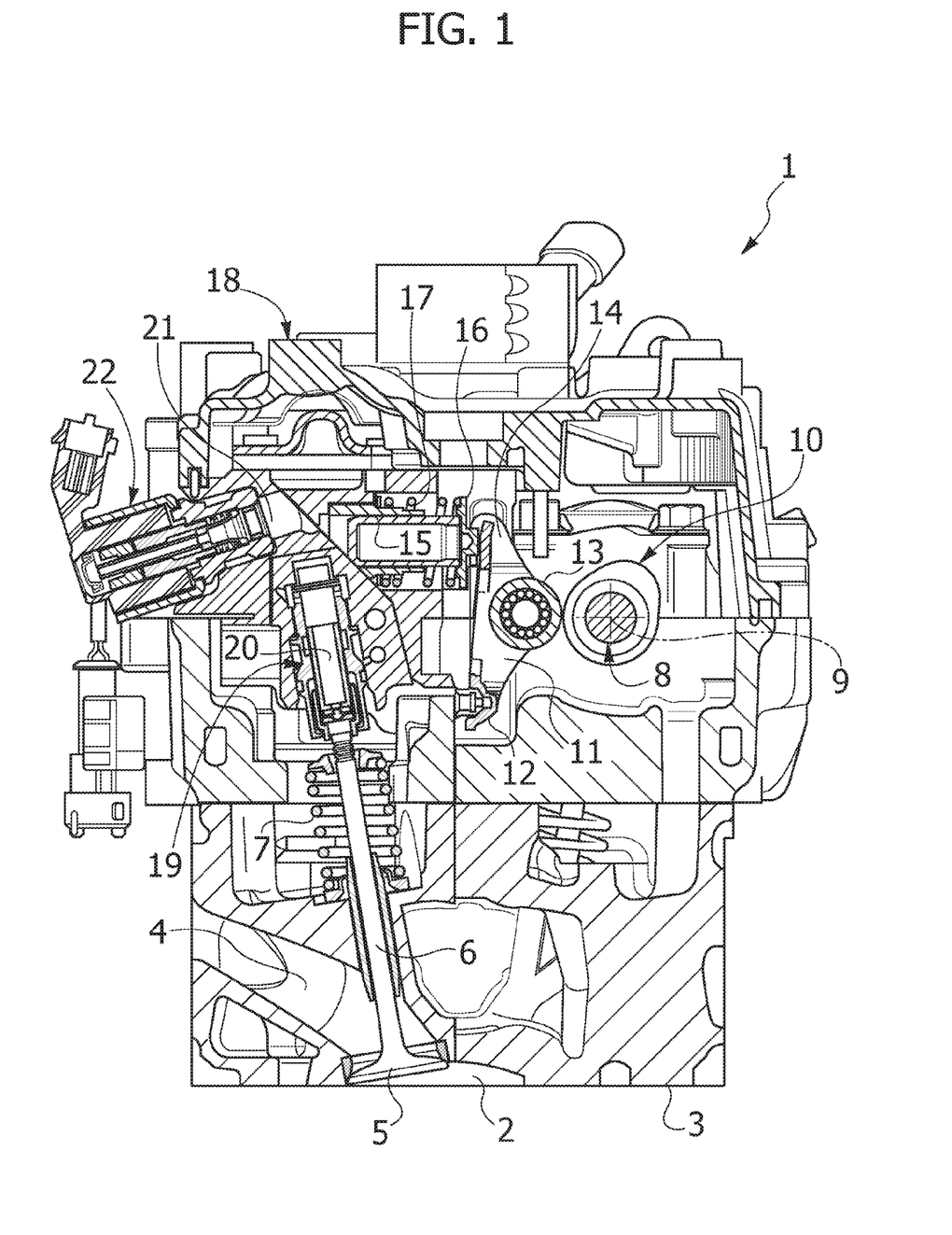
FIGS. 1 and 2 are a cross-sectional view and a corresponding schematic view of an internal-combustion engine provided with the Multiair® system according to the prior art already proposed by the present applicant, on which a preferred embodiment of the present invention is implemented.
Figure 2:
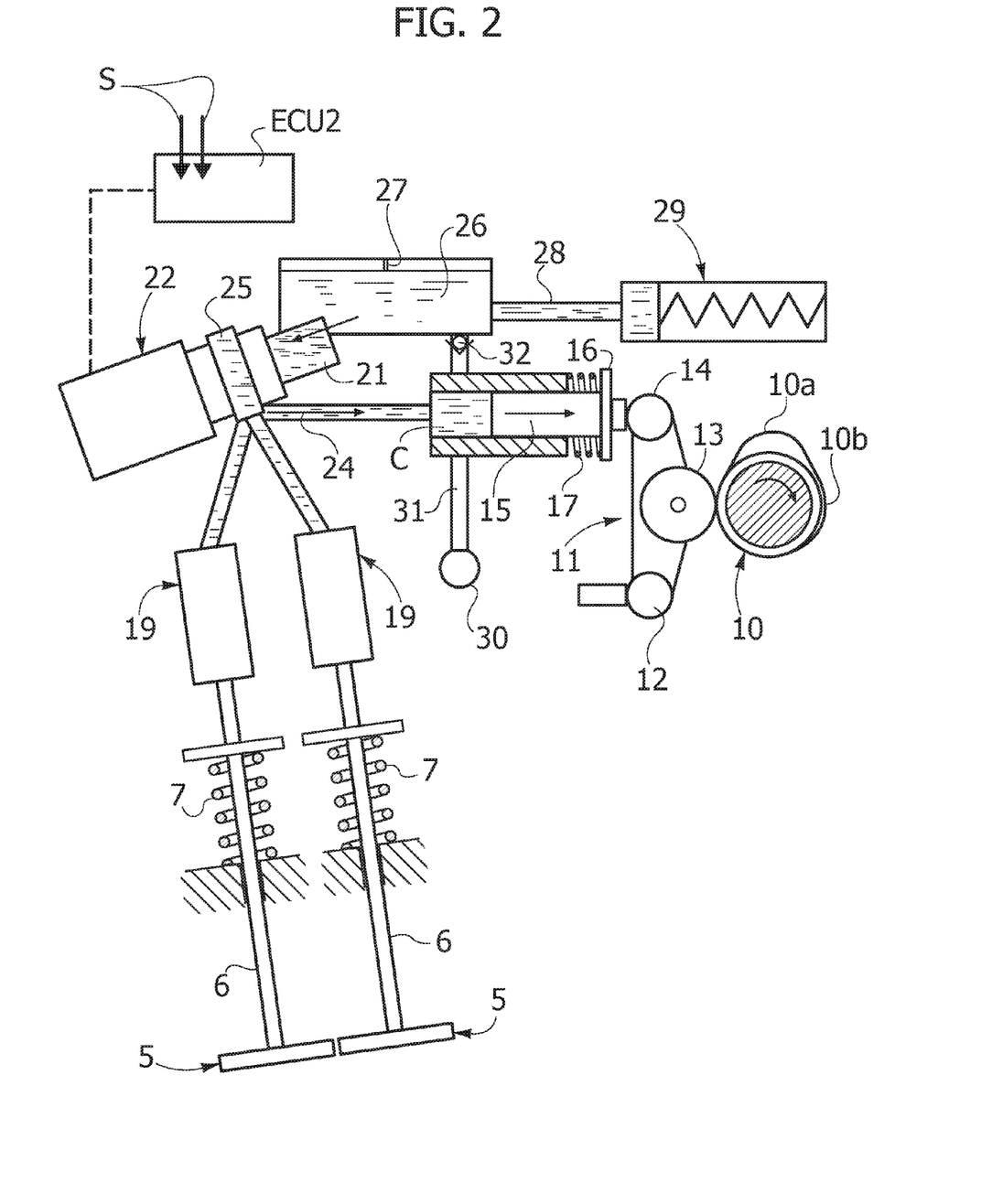

FIGS. 1 and 2 of the annexed drawings refer to an example of internal-combustion engine of the known type, provided with Multiair® system, illustrated in the document No. EP 2 397 674 A1 filed in the name of the present applicant. The preferred embodiment of the invention that is illustrated herein is applied to said engine. As already mentioned, the invention is to be considered, however, applicable also to engines provided with different systems for variable actuation of the intake valves, the sole essential condition being that the system is such as to enable actuation of the valves of one cylinder irrespective of those of the others. The engine according to the invention may be a petrol engine or a diesel engine, with or without supercharging.

Figure 4:
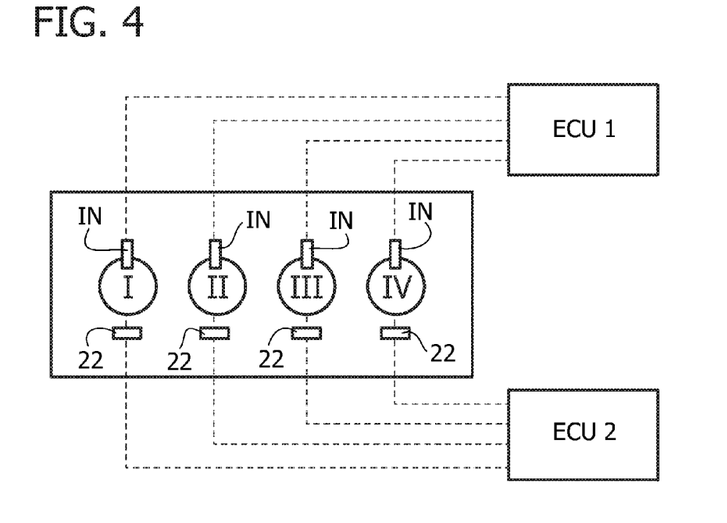
FIG. 4 is a schematic view of a four-cylinder engine to which the present invention can be applied, in which likewise schematically illustrated are the electronic means for control of the supply of fuel to the cylinders and the electronic means for control of the system for variable actuation of the intake valves of the cylinders.

FIG. 1 illustrates in particular a cross-sectional view of the cylinder head of an internal-combustion engine with four cylinders in line I, II, III, IV, according to the diagram illustrated in FIG. 4.

The cylinder head, designated as a whole by the reference number 1, comprises, for each cylinder, a cavity 2 formed on its bottom surface 3 defining the combustion chamber, into which two intake runners 4 (just one of which is visible in the figures) and two exhaust runners (not visible in the figures) give out. The communication of the two intake runners with the combustion chamber 2 is controlled by two intake valves 5 (only one of which is visible in the figures) each comprising a stem 6 slidably mounted in the body of the cylinder head 1. Each valve 6 is recalled towards the closing position by a spring 7 set between an inner surface of the cylinder head 1 and an end cup of the valve. The communication of the two exhaust runners with the combustion chamber is controlled by two valves of a traditional type (not visible in the figures), to which springs for return towards the closed position are likewise associated.

Opening of each intake valve 6 is controlled, in the way that will be described in what follows, by a camshaft 8, which is mounted so that it can turn about an axis 9 inside supports (not visible in the figures) of the cylinder head 1 and comprises a plurality of cams 10 for actuation of the intake valves 5.

Each cam 10 co-operates with a tappet 11, which, in the case of the example illustrated, is constituted by an arm mounted oscillating at one end 12 thereof on the structure of the cylinder head and having a central portion thereof that supports, in a freely rotatable way, a roller 13 co-operating with the cam 10. The opposite end 14 of the oscillating arm 11 controls a pumping piston 15 via a cap 16 connected to the piston 15. The latter is recalled by a spring 17 against the arm 11 so as to keep the arm 11 in contact of co-operation with the cam 10. The pumping piston 15 is slidably mounted in a cavity that is made in a pre-assembled block 18, which is mounted on the cylinder head 1 and incorporates all the electrical and hydraulic devices forming part of the system for variable actuation of the intake valves with which the engine is provided, according to what is described in detail in what follows.

The pumping piston 15 is able to transmit a thrust to the stem 6 of each intake valve 5 so as to cause opening of the latter against the action of the spring 7, by means of fluid under pressure (preferably oil coming from the lubricating circuit of the engine) present in a pressure chamber C (FIG. 2) that the pumping piston 15 faces. Following upon the thrust applied by the pumping piston 15, the oil under pressure is transferred from the chamber C to the chamber of a hydraulic actuator 19, the piston 20 of which pushes the valve 5 towards the open position.

All the parts described above are also visible in FIG. 2, which is a schematic representation of the system illustrated in FIG. 1.

With reference to both of FIGS. 1 and 2, the pressurized fluid chamber C associated to the intake valves 5 of each cylinder can be set in communication with an exhaust channel 21 via a solenoid valve 22 controlled by a programmable electronic control unit ECU2. The solenoid valve 22, which can be of any known type suitable for the function illustrated herein, is controlled by the control unit ECU2 as a function of signals S indicating operating parameters of the engine, such as the position of the accelerator and the engine r.p.m.

When the solenoid valve 22 is open, the chamber C enters into communication, via a channel 24 and a circumferential chamber 25 (FIG. 2), with the exhaust channel 21 so that the fluid under pressure present in the chamber C flows in said channel, and a decoupling of the cam 10 and of the tappet 11 is obtained with respect to the intake valves 5, which hence return rapidly into their closing position, under the action of the return springs 7, in the case where they are in the open condition, corresponding to a phase in which the tappet 11 is in contact with the lobe of the cam 10.

The exhaust channel 21 communicates, according to a solution already proposed by the present applicant, with a tank 26, vented at the top into the atmosphere in 27. The tank 26 in turn communicates via a duct 28 with a pressurized-fluid accumulator 29 (illustrated schematically in FIG. 2).

The exhaust tank 26 finally communicates with a duct 30 connected to the lubricating circuit of the engine via a duct 31, interposed in which is a non-return valve 32 that enables the flow of fluid only in the direction of the tank 26.

In the example illustrated, the engine exhaust valves are controlled in a traditional way via a respective camshaft and a mechanical transmission.

In operation of the engine, in the case where the solenoid valve 22 is kept closed, the chamber C remains full of fluid under pressure and the movements of the cam 10 are transmitted to the intake valves 5 according to a lift profile that corresponds to the profile of the cam 10. The control unit ECU2 is, however, programmed for discharging the chamber C in given conditions of operation of the engine in order to cause closing of the intake valves even when the cam 10 would tend to keep them open. Thanks to said arrangement, it is thus possible to vary the opening time as desired (both as opening duration and as time of start and as end of opening) and/or the lift of the intake valves, for example to provide a delayed opening and/or anticipated closing or provide a plurality of openings and closings within the traditional phase of opening of the intake valves, according to what is described in the prior patents filed in the name of the present applicant.

Once again with reference to FIG. 1, it should once more be noted that the actuator 19 is moreover provided with hydraulic braking means that slow down the final stroke of closing of the intake valve 5 when this closes following upon an opening of the solenoid valve 22 so as to prevent an excessive impact and a consequent damage to the intake valve when the closed position is reached. The hydraulic braking means are not described herein in so far as they can be obtained in any the ways known from the prior patent documents filed in the name of the present applicant.

In the patent application No. EP 2 397 674 A1 already referred to previously, the present applicant has proposed a system of the type specified above for variable actuation of the intake valves of an internal-combustion engine, where the cams for actuation of the engine intake valves each have a profile comprising a main portion for bringing about opening of the intake valve during the intake stroke in the respective cylinder of the engine and an additional portion for bringing about partial opening of the intake valves also during the exhaust stroke in the respective cylinder.

Figure 3:
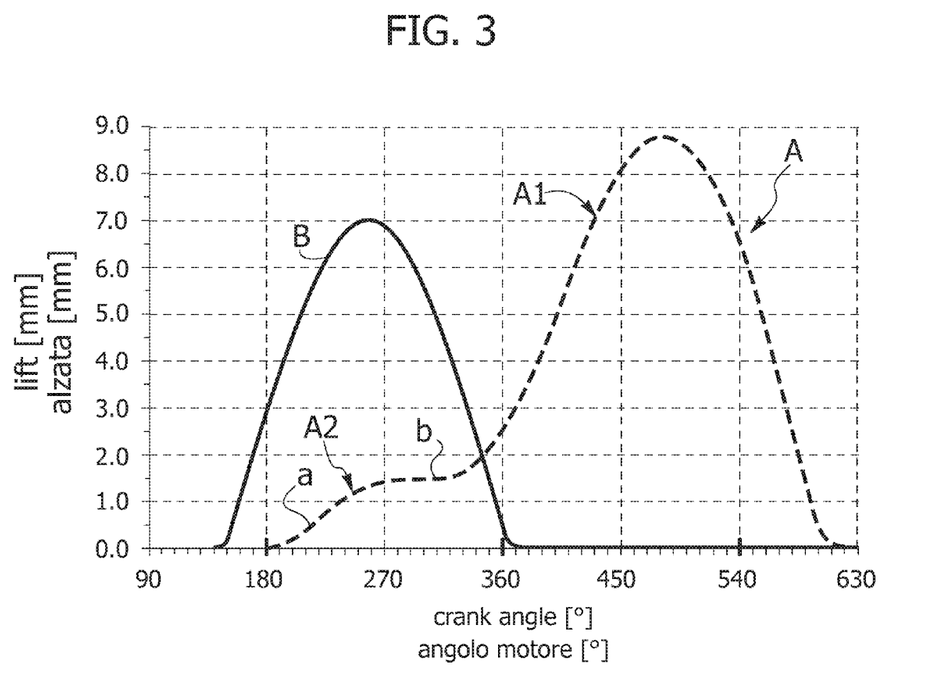
FIG. 3 is a diagram that shows the profiles of lift of the exhaust valves and of the intake valves of an engine of the type illustrated in FIG. 1, said lift profiles being likewise adopted in the engine according to the present invention.

FIG. 3 of the annexed drawings shows a diagram that represents the lift profiles of the intake valve and of the exhaust valve of a cylinder of an engine of this type, said solution also being used in the preferred embodiment of the invention.

In said figure, the profile A is the one regarding the lift of the intake valve, and the profile B is the one regarding the lift of exhaust valve. The diagram shows the lift in millimeters as a function of the crank angle. In the convention assumed in the diagram of FIG. 3, the crank angle of 180° corresponds to the condition in which the piston is at bottom dead centre (BDC), at the start of the exhaust stroke in the cylinder. The angle of 360° corresponds to the condition in which the piston has reached top dead centre (TDC), at the end of the exhaust stroke and at the start of the subsequent intake stroke, which terminates in theory at a crank angle of 540°, where the piston is once again at BDC. As may be seen in FIG. 3, the profile A has a main portion A1 (having the traditional bell shape) that causes opening of the valve during the normal intake stroke in the cylinder and an additional portion A2, which causes an additional lift of the intake valve during the exhaust stroke. The additional profile A2 substantially extends from an angle of 180° (BDC), at the start of the exhaust stroke, with a first ascending stretch "a" radiused with a second stretch "b" with substantially constant lift, equal to a fraction of the maximum lift reached by the intake valve during the intake stroke. The stretches A1 and A2 of the profile A of lift of the intake valve are determined by a corresponding profile of the cam 10 (FIG. 2), which has a lobe including a main portion 10a corresponding to the portion A1 of the lift profile and an additional portion 10b corresponding to the portion A2 of the lift profile.

As indicated, also the preferred embodiment of the engine according to the invention is provided according to what is illustrated in FIGS. 1-3. FIG. 4 shows the working diagram of the engine according to the invention, with reference to a solution with four cylinders in line, where the cylinders are respectively designated by I, II, III, and IV. Illustrated schematically in FIG. 4 are the solenoid valves 22 of the system for variable actuation of the intake valves provided for each cylinder of the engine. In the preferred embodiment, each cylinder is provided with two intake valves. FIG. 4 is a schematic illustration of the electronic control unit ECU2 that controls the solenoid valves 22 of the system for variable actuation of the intake valves of the cylinders, as well as the electronic control unit ECU1 that controls operation of the fuel injectors IN associated to the cylinders. In the engine according to the invention a modality is envisaged in which one, and only one, part of the cylinders of the engine is deactivated by interrupting supply of fuel to said cylinders. In the example illustrated, it is envisaged that the cylinders that can be deactivated are the cylinders II and III illustrated in FIG. 4. Once again according to the invention, it is envisaged that during the step in which the cylinders II and III are deactivated, the intake valves of said cylinders will be controlled with the modalities described hereinafter with reference to FIG. 5.

Figure 5:
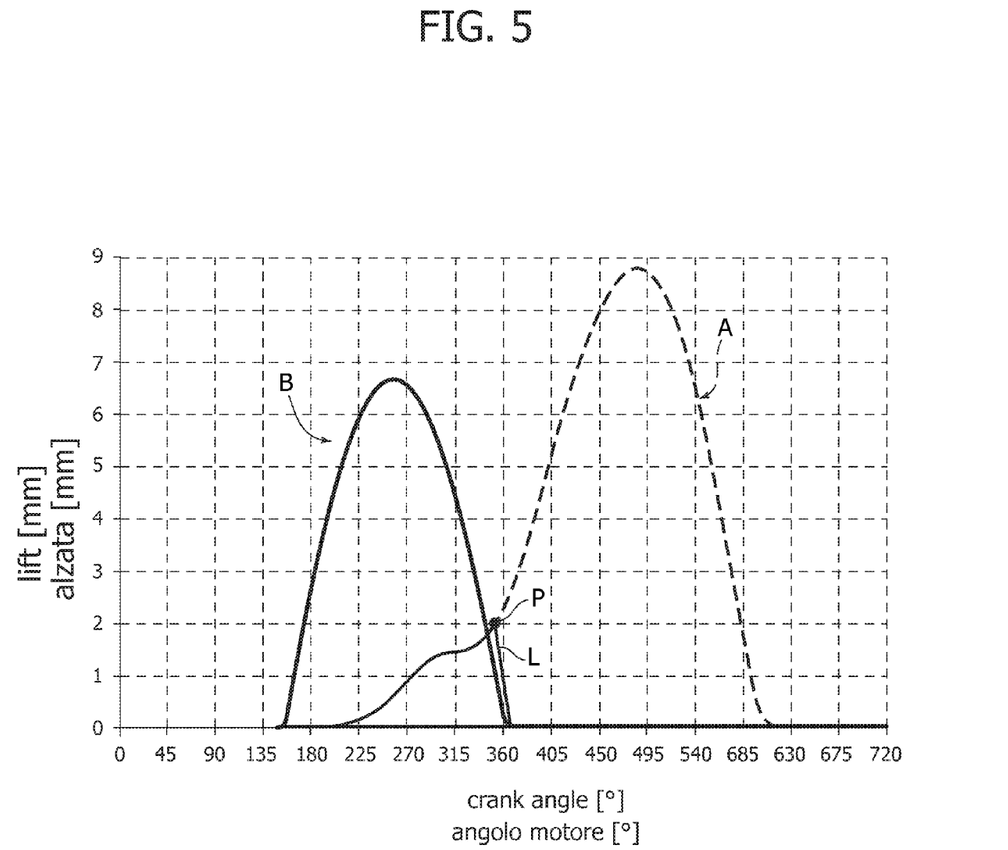
FIG. 5 is a diagram similar to that of FIG. 3, which shows how the intake valves of the deactivated cylinders are controlled in the engine according to the invention.

FIG. 5 illustrates the same diagram as that of FIG. 3, but shows that the angular range of rotation of the engine shaft in which the intake valves of the deactivated cylinders are rendered active is limited to the one in which the exhaust valves of the inactive cylinders themselves are also open. This is obtained in so far as the solenoid valves 22 of the system for variable actuation of the intake valves of the deactivated cylinders are kept closed only in the range in which the exhaust valves of the same deactivated cylinders are also open, whilst the solenoid valve 22 of each deactivated cylinder is opened so as to keep the intake valves of each deactivated cylinder closed after closing of the exhaust valve or valves of the cylinder itself. Said mode of operation is highlighted by the fact that, in FIG. 5, the diagram A that illustrates the theoretical lift of each intake valve of each deactivated cylinder is represented by a dashed line subsequent to a point P at which the solenoid valve 22 is opened so as to cause closing of the intake valves (line L) simultaneously with closing of the exhaust valve of the deactivated cylinder itself.

Said mode of operation constitutes a first important difference as compared to the solution known from the prior document No. EP 2 397 674 A1, where, as already referred to above, the intake valves of the deactivated cylinders were kept open both during the phase of opening of the exhaust valves and after closing of the exhaust valves, for a time sufficient to enable the mass of exhaust gases that in the valve-crossing phase had passed from the cylinder to the respective supply runner to return into the cylinder. Consequently, in the known solution said mass of exhaust gases had displaced continuously between the combustion chamber of each deactivated cylinder and the respective supply, without, however, ever reaching the plenum of the intake manifold. As already illustrated above, said known solution aimed in this way at obtaining a reduction to a minimum of the pumping losses due to the deactivated cylinders.

Figure 6:
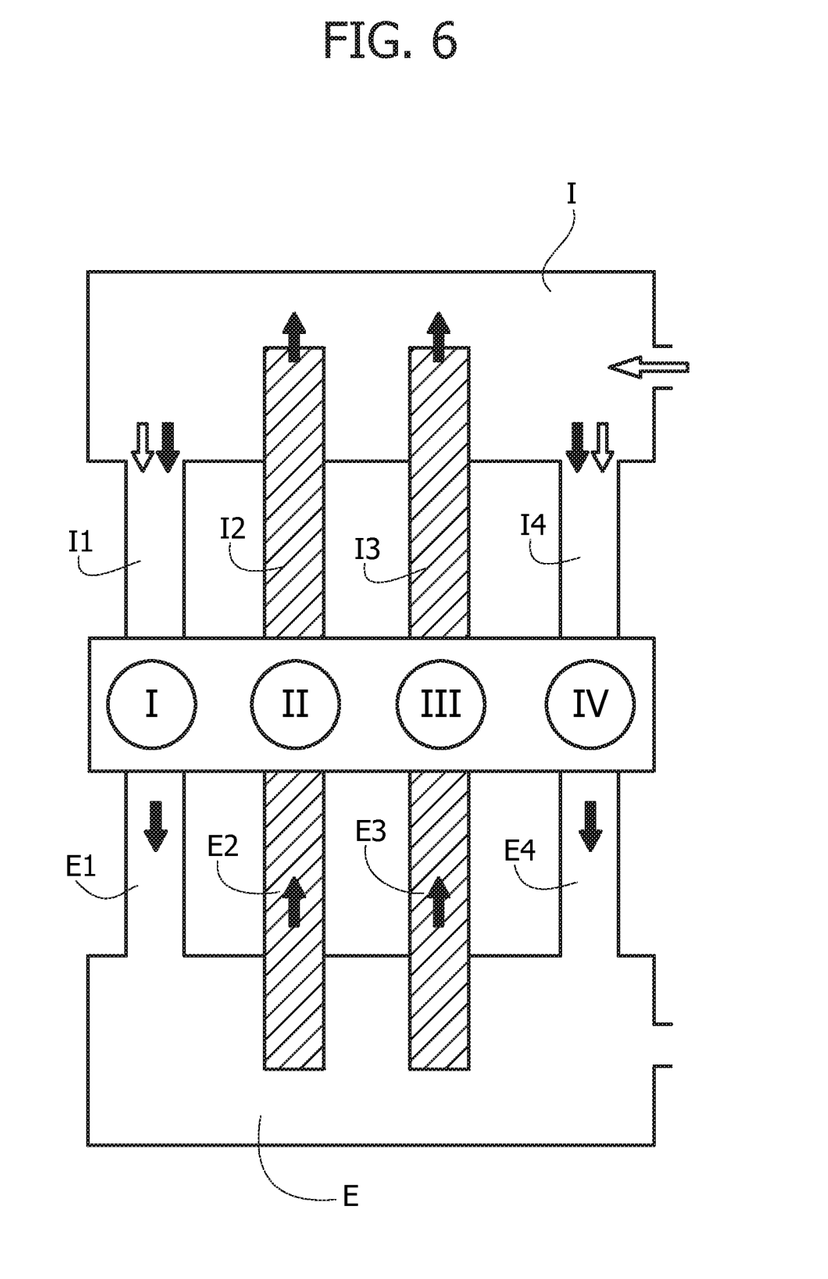
FIG. 6 is a further schematic view of an embodiment of the engine according to the invention, which illustrates the principle of operation thereof during the step of de-activation of two cylinders.

With reference now both to FIG. 5 and to FIG. 6, in the case of the example illustrated here the intake valves of the deactivated cylinders are closed together with the exhaust valves of the same cylinders so as to prevent the deactivated cylinders from possibly sucking into them the exhaust gases previously sent into the intake runners of the deactivated cylinders. Consequently, in the engine according to the invention, unlike the known solution, the effect of pumping due to the deactivated cylinders is instead rendered maximum in order to obtain the benefit that will be illustrated hereinafter.

With reference to FIG. 6, the references I and E designate, respectively, the intake manifold and the exhaust manifold of the engine according to the invention. The references I1, I2, I3, I4 designate as a whole the intake runner or runners of the four cylinders I, II, III, IV, whilst the references E1, E2, E3, E4 designate as a whole the exhaust runner or runners of each cylinder.

In the engine according to the invention, the opening lift of the intake valves of the inactive cylinders and the duration of their opening are chosen in such a way as to guarantee that in the phase in which the cylinders II, III are deactivated, the effect of pumping of said cylinders will enable a mass of exhaust gases to be drawn in by the deactivated cylinders II, III from the exhaust manifold E, through the exhaust runners E2, E3, and sent directly to the intake manifold I, through the intake runners I2, I3.

In this way, the recirculated exhaust gases (black arrows in FIG. 6) mix with the fresh air (white arrows) that is fed to the intake manifold I and are cooled thereby so as to occupy a smaller volume. The smaller volume of the recirculated exhaust gases resulting from the aforesaid cooling means that a greater mass of recirculated gases can be introduced into the active cylinders I, IV together with the charge of fresh air. The greater amount of EGR gases introduced at intake of the active cylinders enables an increase in the efficiency of operation of the engine.

As has already been discussed above, the studies and experiments conducted by the present applicant have surprisingly shown that in this way the increase in efficiency of the engine abundantly compensates for the losses due to the greater pumping effect of the deactivated cylinders so that globally the efficiency of the engine thus controlled is higher than that according to the known solution illustrated in the document No. EP 2 397 674 A1.

The mixing of EGR gases with the air prior to supply to the active cylinders, in addition to enabling an increase in the efficiency of the engine as a result of the introduction of a greater amount of gas, also enables an increase in the tolerable amount of EGR gases without causing instability of combustion.

In general, in the engine according to the invention, the degree of EGR gases that reaches the intake manifold following upon pumping by the inactive cylinders is a function both of the opening lift of the intake valves of the inactive cylinders, which depends upon the profile A2 (FIG. 3) of the cam, and of the duration of the opening of the intake valves of the inactive cylinders.

The exact duration of the opening of the intake valves of the inactive cylinders is in any case established by seeking a point of minimum consumption of fuel as a compromise between the stability of combustion, the pumping losses, and the efficiency of the engine.

Figure 8:
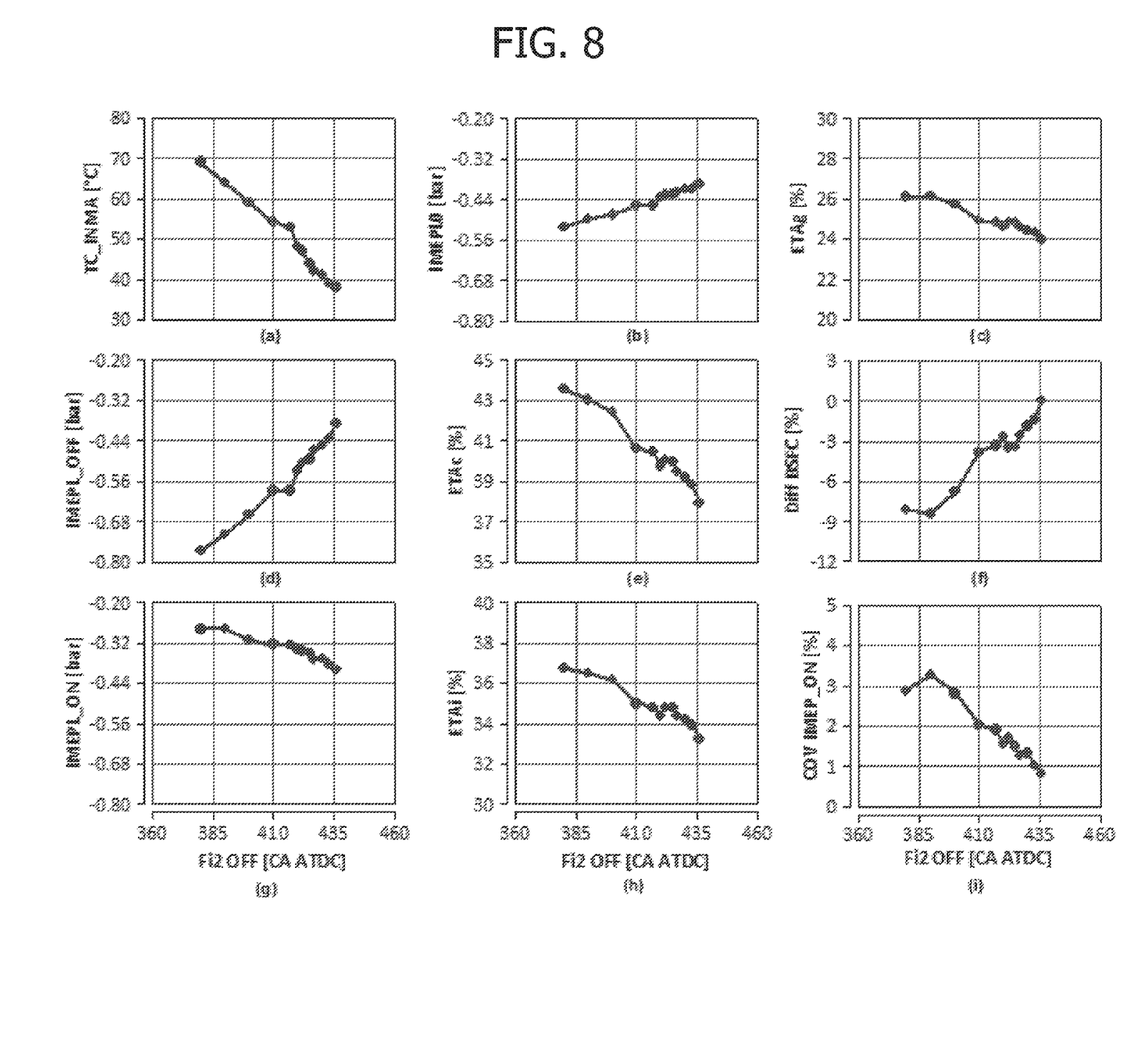
FIGS. 8 and 9 are experimental diagrams that illustrate the advantages of the engine according to the invention (FIG. 8) as compared to an engine that does not envisage mixing of EGR gases in the intake manifold (FIG. 9).
Figure 9:
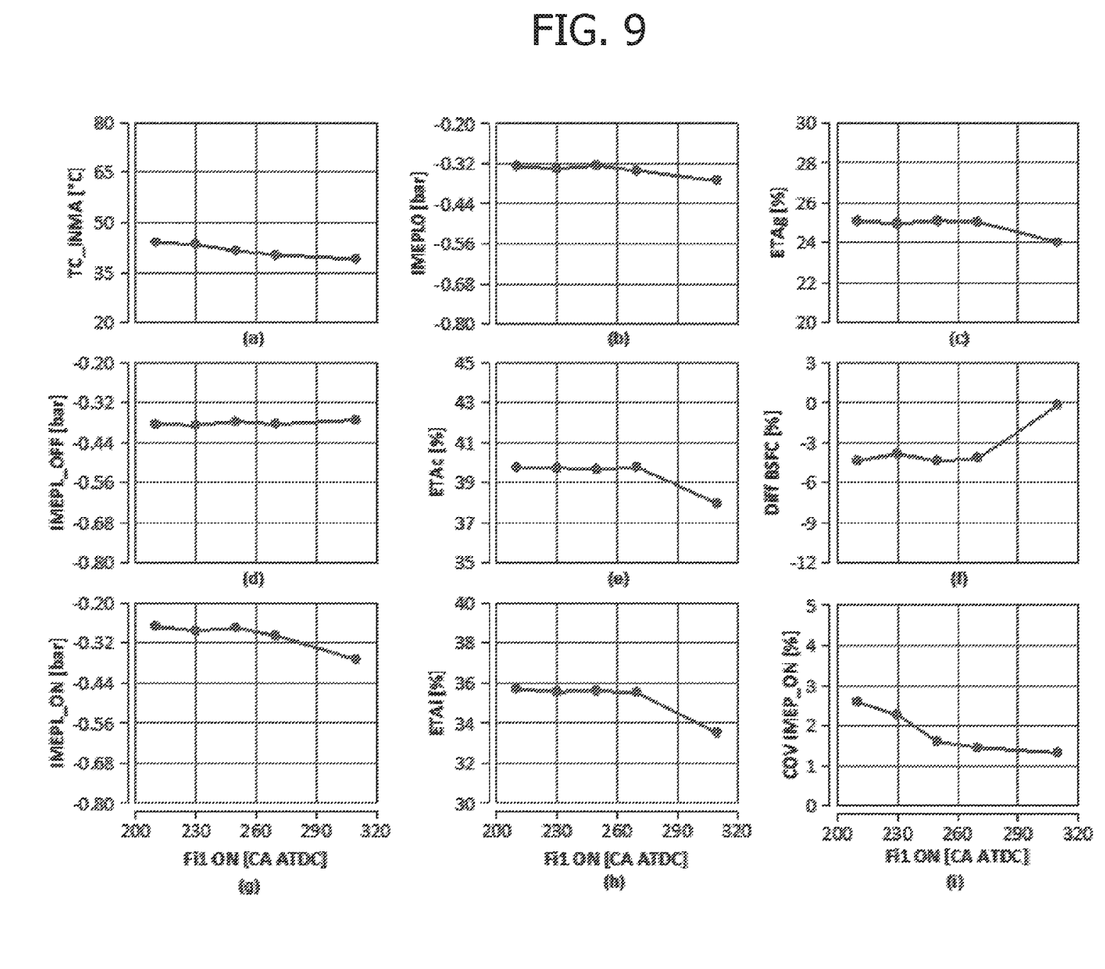

In FIGS. 8, 9 a series of references are used, the meaning of which is given below:

Fi1 ON=angle of opening of the intake valves in the active cylinders;

Fi2 OFF=angle of closing of the intake valves in the deactivated cylinders;

BSFC=specific fuel consumption in engine-braking mode (Brake-Specific Fuel Consumption);

Diff BSFC=normalized specific fuel consumption;

TC_INMA=temperature of intake manifold;

IMEPL=indicated mean effective pressure of the pumping cycle;

IMEPL ON=indicated mean effective pressure of the pumping cycle in the active cylinders;

IMEPL OFF=indicated mean effective pressure of the pumping cycle in the deactivated cylinders;

IMEPL0=indicated mean effective pressure of the pumping cycle averaged over four cylinders;

ETAc=$P_h/(m_c H_i)$→combustion efficiency ($P_h$ is the power supplied by the high-pressure cycle, not comprising the pumping cycle (FIG. 1$b$); $m_c$ is the mass flow rate of fuel; and $H_i$ is the lower calorific power of the fuel);

ETAi=$P_i/(m_c H_i)$→indicated efficiency ($P_i$ is the power supplied by the net pressure cycle, hence comprising the pumping cycle—FIG. 1$a$);

ETAg=$P_b/(m_c H_i)$→global efficiency ($P_b$ is the power to the brake; hence it comprises the pumping cycle and the losses due to friction);

COV IMEP_ON=coefficient of variation of the indicated mean effective pressure IMEP in the active cylinders.

FIG. 8 shows the variation of the various parameters listed above as a function of the variation of the engine angle (Fi2 OFF) at which the intake valves of the deactivated cylinders that pump EGR gases into the intake manifold close. FIG. 8$a$ shows the temperature of the intake manifold. FIG. 8$b$ shows the mean effective pressure of the pumping cycle averaged on the four cylinders. FIG. 8$c$ shows the global efficiency. FIG. 8$d$ shows the mean effective pressure of the pumping cycle of the cylinders that introduce EGR gases. FIG. 8$e$ shows the combustion efficiency. FIG. 8$f$ shows the normalized specific fuel consumption. FIG. 8$g$ shows the mean effective pressure of the pumping cycle of the active cylinders. FIG. 8$h$ shows the indicated efficiency. FIG. 8$i$ shows the coefficient of variation of the IMEP of the active cylinders.

As may be seen in the aforesaid diagrams derived from the tests conducted by the present applicant, as the angle of closing decreases, the amount of exhaust gases that is introduced into the intake manifold and that inside it cools and mixes with the air present therein increases. Globally, the temperature within the intake manifold increases as a result of the thermal exchanges (TC_INMA in FIG. 8$a$).

The losses due to the pumping cycle of the cylinders that introduce EGR gases increase as Fit decreases (IMEPL_OFF in FIG. 8$d$), said decrease being due to the increase in the phase of over-expansion of the charge that occurs with the intake valves closed.

Figure 7:
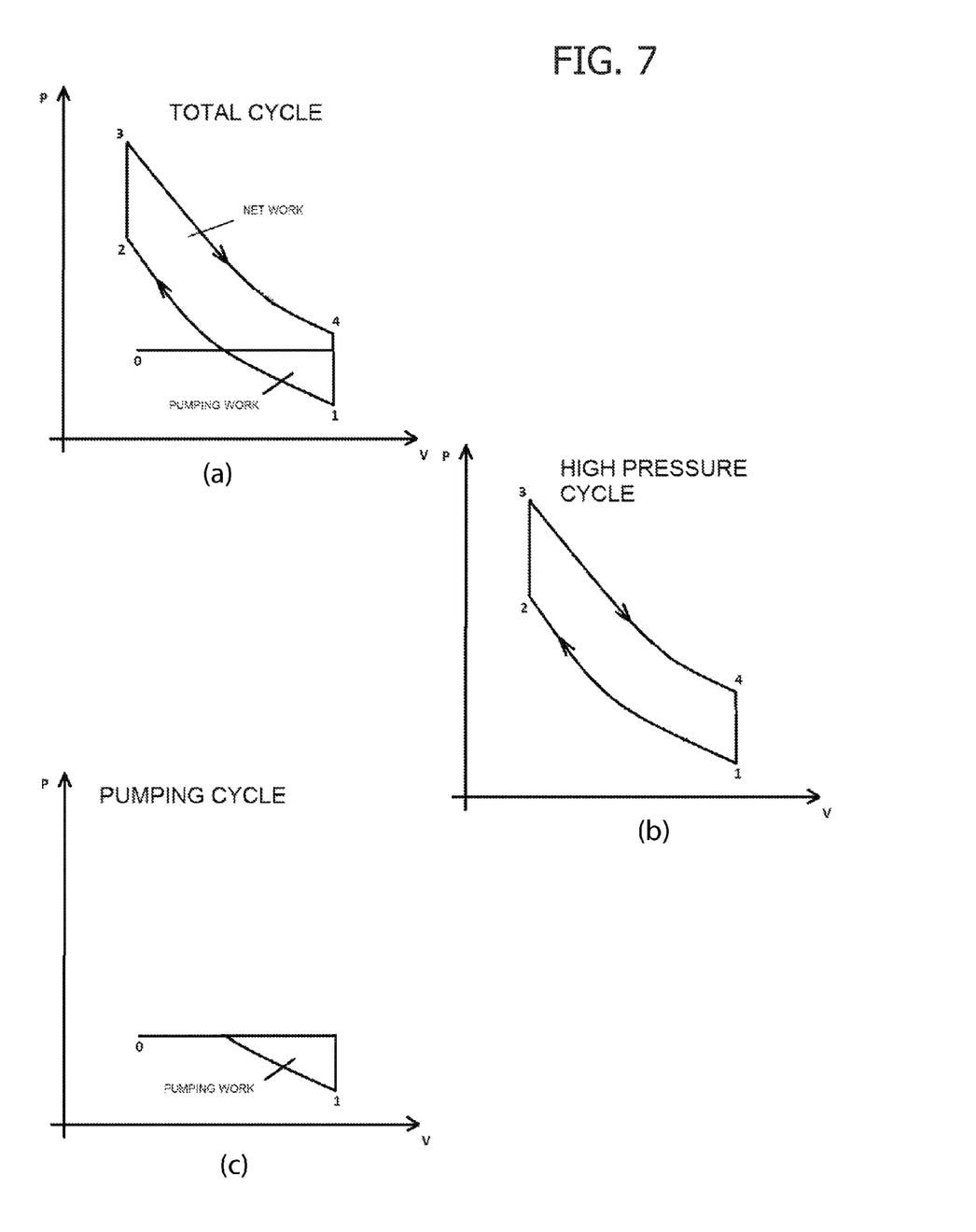
FIG. 7 illustrates the overall work cycle (FIG. 7a), comprising a high-pressure cycle (FIG. 7b) and a pumping cycle (FIG. 7c)

The progressive introduction of EGR gases causes an increase in the combustion efficiency from 38% to 44% as a result of the increase in the temperature of point 2 (FIG. 7) of the thermodynamic cycle: this means that a lower amount of fuel is necessary to produce the same indicated mean effective pressure.

The introduction of EGR gases by the inactive cylinders occurs with a certain absorption of torque that depends upon the work of pumping that said cylinders perform to introduce EGR gases into the intake manifold (IMEPL_OFF in FIG. 8d).

The indicated efficiency (FIG. 8h) is affected by the pumping losses that increase as the EGR gases are introduced and ranges from 33% to 37%. As compared to the combustion efficiency, the variation is less marked, but the increase in efficiency affords in any case advantages notwithstanding the fact that energy is required to introduce the exhaust gases into the manifold.

The increase in the work of pumping of the inactive cylinders is partially compensated by the reduction of IMEPL of the active cylinders (FIGS. 8d, 8g and 8b). Since they take in a progressively diluted mixture, the active cylinders are hence characterized by an Fi2 that increases as the EGR gases increase with a phase of over-expansion of the charge that continues to drop.

Globally, the specific consumption continues to decrease compatibly with the limits on the stability of combustion (coefficient of variation of IMEP (=Standard Deviation/Mean Value·100)<3%) that depends upon the degree of dilution of the mixture taken in.

By comparison, FIG. 9 gives the variation of the various parameters as a function of the angle of opening of the intake valves of the active cylinders (Fi1 ON), i.e., of the cylinders that perform combustion cycles. The inactive cylinders have been regulated in this case in such a way as to minimize their pumping cycle, said regulation being obtained by causing EGR gases to recirculate in the valve-crossing phase and by closing the intake valves before air is introduced.

In FIG. 9, FIG. 9a shows the temperature in the intake manifold, FIG. 9b shows the mean effective pressure of the pumping cycle averaged over the four cylinders, FIG. 9c shows the global efficiency, FIG. 9d shows the mean effective pressure of the pumping cycle of the cylinders that introduce EGR gases, FIG. 9e shows the combustion efficiency, FIG. 9f shows the normalized specific fuel consumption, FIG. 9g shows the mean effective pressure of the pumping cycle of the active cylinders, FIG. 9h shows the indicated efficiency, and FIG. 9i shows the coefficient of variation of the IMEP of the active cylinders.

As in the case of FIG. 8, there may be noted a reduction of consumption as the phase of crossing between the intake and exhaust valves increases. The differences between the two situations consist in the fact that in the case of FIG. 9 the exhaust gases have not been introduced and mixed in the intake manifold. In fact, the temperature inside it remains practically constant (FIG. 9a), the pumping of the inactive cylinders is constant, and the global pumping decreases because the cylinders in the combustion stroke take in an increasing amount of air and EGR gases.

The advantages in terms of consumption that can be obtained in the case of FIG. 9 are less than in the case of the invention illustrated in FIG. 8. This happens because by cooling EGR gases in the intake manifold it is possible to introduce a larger amount thereof. The levels of combustion efficiency indicated (ETAc and ETAi in FIGS. 9e and 9h) are an index of this phenomenon.

The methodology forming the subject of the invention affords considerable advantages in terms of consumption thanks to the increase in the thermodynamic efficiency of the cycle that occurs by means of recirculation of cooled exhaust gases in the combustion chamber. The exhaust gases are taken in once again from the exhaust and introduced into the intake manifold by one or more cylinders during the valve-crossing phase; since said cylinders are not performing combustion cycles, thy behave as reciprocating volumetric pumps. Cooling occurs in the intake manifold, which is used as heat exchanger. In the table below, there emerge the advantages in terms of consumption levels in the two modalities in different engine points: the increase in indicated efficiency enables a gain that ranges from 3%

| Engine Point | Gain in consumption levels as compared to conventional method [%] |
| --- | --- |
| 1500 x 2 | 13 |
| 2000 x 1 | 6 |
| 2000 x 2 | 5 |
| 2000 x 3 | 3 | to 13%, as appears in the table below.

Of course, without prejudice to the principle of the invention, the details of construction and the embodiments may vary widely with respect to what is described and illustrated herein purely by way of example, without thereby departing from the scope of the present invention.

For example, it is also possible to provide a heat exchanger between the runners and the common chamber of the intake manifold in such a way as to reduce further the temperature of the recirculated exhaust gases.

What is claimed is:

1. An internal-combustion engine comprising:
   a plurality of cylinders;
   an intake manifold and an exhaust manifold each with a chamber in common and respective intake ducts or runners and exhaust ducts or runners, which connect said common chamber to said cylinders;
   at least one intake valve and at least one exhaust valve for each cylinder, associated to respective intake and exhaust runners;
   a first system for variable actuation of the intake valves;
   a second system for supply of fuel to each cylinder; and
   electronic control means for controlling said first system and said second system,
   wherein said electronic control means are programmed for interrupting supply of fuel to one or more cylinders of the engine in given conditions of operation of the engine so as to deactivate said cylinders, maintaining supply of fuel to one or more further cylinders, which thus remain active,
   wherein said electronic control means are moreover programmed for maintaining an operating cycle of opening and closing of the intake valves and exhaust valves of the deactivated cylinders,
   wherein said electronic control means are moreover programmed for keeping open said at least one intake valve of each deactivated cylinder when said at least one exhaust valve of the same deactivated cylinder is also open,
   wherein an opening lift and an opening duration of said at least one intake valve of each deactivated cylinder in a stage of operation of the engine with deactivated cylinders are chosen in such a way that said deactivated cylinders are able to pump exhaust gases from the common chamber of the exhaust manifold up to the common chamber of the intake manifold of the engine, whereby said recirculated exhaust gases enter the active cylinders after being cooled by the air present in the intake manifold, as to enable a larger mass thereof to enter into the active cylinders, and wherein the aforesaid electronic control means are programmed for keeping open said at least one intake valve of each deactivated cylinder only when said at least one exhaust valve of the same deactivated cylinder is also open.

2. The engine according to claim 1, wherein said electronic control means are programmed for closing said at least one intake valve of each deactivated cylinder simultaneously with closing of said at least one exhaust valve of the same deactivated cylinder.

3. The engine according to claim 1, wherein said first system comprises a camshaft for governing the intake valves of said cylinders, a tappet co-operating with each cam of the camshaft, and a hydraulic system set between said tappet and said at least one intake valve of each cylinder, said hydraulic system including a pressurized chamber between a pumping piston controlled by said tappet and a hydraulic actuator of each intake valve, as well as a solenoid valve for connecting each pressure chamber with an exhaust channel in order to uncouple the movement of the intake valve with respect to the respective control cam, said solenoid valve being controlled by said electronic control means.

4. The engine according to claim 1, wherein it comprises a heat exchanger between the runners and the common chamber of the intake manifold in such a way as to reduce further the temperature of the recirculated exhaust gases.

5. A method for controlling an internal-combustion engine, said engine comprising:
a plurality of cylinders;
an intake manifold and an exhaust manifold each with a chamber in common and respective intake runners and exhaust runners that connect said common chamber to said cylinders;
at least one intake valve and at least one exhaust valve for each cylinder, associated to respective intake and exhaust runners;
a first system for variable actuation of the intake valves;
a second system for supply of fuel to each cylinder; and
electronic control means for controlling said first system) and said second system,
wherein the aforesaid electronic control means interrupt supply of fuel to one or more cylinders of the engine in given conditions of operation of the engine so as to deactivate said cylinders, maintaining supply of fuel to one or more further cylinders, which thus remain active,
wherein said electronic control means maintain an operating cycle of opening and closing of the intake valves and exhaust valves of the deactivated cylinders, and
wherein said electronic control means keep said at least one intake valve of each deactivated cylinder open when said at least one exhaust valve of the same deactivated cylinder is also open,
wherein said deactivated cylinders pump exhaust gases from the common chamber of the exhaust manifold as far as the common chamber of the intake manifold of the engine, so that said recirculated exhaust gases enter the active cylinders after being cooled by the air present in the intake manifold in order to enable entry of larger masses into the active cylinders, and
wherein the aforesaid electronic control means keep said at least one intake valve of each deactivated cylinder open only when said at least one exhaust valve of the same deactivated cylinder is also open.

6. The method according to claim 5, wherein said at least one intake valve of the deactivated cylinders is closed simultaneously with closing of said at least one exhaust valve of the same deactivated cylinder.

\* \* \* \* \*